United States Patent
Bullock et al.

(10) Patent No.: US 7,794,791 B2
(45) Date of Patent: Sep. 14, 2010

(54) TEXTILE PROCESS AND PRODUCT

(75) Inventors: Kyle R. Bullock, Gastonia, NC (US); Norman James Sanders, Cliffside, NC (US)

(73) Assignee: Preferred Finishing, Inc, Blacksburg, SC (US)

( * ) Notice: Subject to any disclaimer, the term of this patent is extended or adjusted under 35 U.S.C. 154(b) by 0 days.

(21) Appl. No.: 12/655,218

(22) Filed: Dec. 24, 2009

(65) Prior Publication Data

US 2010/0101697 A1   Apr. 29, 2010

Related U.S. Application Data

(62) Division of application No. 11/117,196, filed on Apr. 28, 2005, now Pat. No. 7,638,444.

(60) Provisional application No. 60/566,207, filed on Apr. 28, 2004.

(51) Int. Cl.
*B05D 5/00* (2006.01)
(52) U.S. Cl. .................................. 427/288; 427/322
(58) Field of Classification Search ................ 427/261, 427/288, 322, 389.9
See application file for complete search history.

(56) References Cited

U.S. PATENT DOCUMENTS

| | | |
|---|---|---|
| 3,438,940 A | 4/1969 | Dieter et al. |
| 4,027,062 A | 5/1977 | Engelbrecht et al. |
| 4,594,286 A | 6/1986 | McKinney et al. |
| 4,833,006 A | 5/1989 | McKinney et al. |
| 5,395,402 A | 3/1995 | Duckett |
| 5,565,265 A | 10/1996 | Rubin et al. |
| 6,023,823 A | 2/2000 | Rubin et al. |
| 6,165,920 A | 12/2000 | Rubin et al. |
| 6,207,250 B1 | 3/2001 | Bullock et al. |
| 6,251,210 B1 | 6/2001 | Bullock et al. |
| 6,492,001 B1 | 12/2002 | Rubin et al. |
| 6,541,138 B2 | 4/2003 | Bullock et al. |

*Primary Examiner*—Arti Singh-Pandey
(74) *Attorney, Agent, or Firm*—J. Bennett Mullinax LLC

(57) ABSTRACT

A method for treating textile fabrics is described in which there is applied to a fabric a first treatment composition comprising a fluorochemical textile treating agent. A second treatment composition is applied to one side of the fabric such that a layer of the second treatment composition is formed on that side subsequent to a drying step. A polymeric film is then adhered to the formed layer. The process and the resulting product are characterized in that no formaldehyde of formaldehydic compounds are used in the treatment compositions or the film, and a formaldehyde scavenger is included in at least one of the treatment compositions. The resulting fabric is environmentally friendly and exhibits a high degree of soil and water resistance without sacrificing aesthetic qualities.

2 Claims, No Drawings

TEXTILE PROCESS AND PRODUCT

RELATED APPLICATIONS

This application claims the benefit of U.S. Provisional Application Ser. No. 60/566,207, filed on Apr. 28, 2004, and which is incorporated herein by reference.

FIELD OF INVENTION

This invention relates to a textile process, the product thereof, and a chemical formulation used for preparing fabric for use not limited to but primarily designed for demanding environments such as restaurants, hospitals, and other public facilities. More specifically, this invention relates to a process by which fabric is rendered highly water resistant and water and stain repellent without significantly altering the hand or other aesthetic qualities of the fabric.

BACKGROUND OF THE INVENTION

A challenge faced by fabric processors is to produce a fabric having desired characteristics such as water and stain repellence while maintaining both the desired look of the fabric and the tactile feel ("hand"). For fabrics intended for use in high-traffic areas such as restaurants, hotel rooms, hospices, and other such facilities, it is desirable that the fabric be highly resistant to wetting and staining, and be durable. Examples include fabrics used for tablecloths in restaurants, bedding in hospitals, and upholstery in hotels. At the same time, it is desirable that these fabrics be aesthetically pleasing, both to the eye and to the touch.

In addition to being stain repellent, it is also often desirable for a fabric used in high traffic areas to be water repellent and resistant. In this context, the terms "water repellent" and "water resistant" are used interchangeably unless otherwise specifically noted. "Water resistant" is sometimes used to mean that a substance is chemically resistant to the action of water and/or will not be removed by exposure to water. As used herein, "water resistant" and "water repellent" are used to mean the quality of being impervious to water, both as to wetting of the fabric and as to passage of a liquid through the fabric. It should be noted, however, that a fabric that is water resistant need not necessarily also be vapor resistant, and it is often desired that water repellent and resistant fabrics specifically retain vapor permeability.

There are several ways of rendering a fabric water resistant. In some treatments, a fabric may be treated first with a soap and then with metal stearates. Other treatments include the use of silicon compounds such as polydimethylsiloxane. In addition to treatment with stearates, other wax or waxlike treatments have been used such as treatments involving paraffins or ethylene/vinyl acetate copolymers. Examples of these types of coatings can be found, for example, in U.S. Pat. Nos. 4,027;062; 4,833,006; and 4,594,286 and which are incorporated herein by reference. While fabrics prepared according to these disclosures exhibit water resistance, it has been claimed elsewhere that these fabrics have an unacceptable hand and suffer from other problems rendering them unsuitable for use in all situations. See for example, U.S. Pat. No. 6,251,210 and which is incorporated herein by reference.

Other solutions to the problem of finding an acceptable combination of water and stain resistance, durability, and aesthetic qualities have included the creation of synthetic leathers and vinyl (particularly polyvinylchloride) coated fabrics. To date, synthetic leathers have failed to replace genuine leather. Vinyl coated fabrics are very heavy, completely lacking the feel of cloth.

Other attempts to create water and stain resistant fabrics have involved the use of fluorochemicals, exemplified by SCOTCHGARD® (3M Corporation, St. Paul, Minn.). Applications of relatively small amounts of these types of fluorchemical treating agents can render fabrics somewhat resistant to water and stains. To achieve a more complete resistance to these factors requires application of such thick coatings of these agents which impairs the desired look and hand of the fabric.

Several attempts have been made to provide a fabric treated to be water and stain resistant. One example of a method for treating fabrics is found in U.S. Pat. No. 6,541,138, the disclosure of which is incorporated herein by reference. According to the disclosure of this patent, a fabric is rendered stain and water resistant by subjecting it to two treatments, either or both of which may be repeated as desired. According to a first embodiment of this method, the fabric is first treated with a composition minimally comprising a urethane latex, an acrylic latex, a cross-linking resin, at least one antimicrobial agent, and an organic fluorochemical treating agent, such as SCOTCHGARD®. The fabric is then dried and cured at an elevated temperature. The fabric is then subjected to treatment with a second composition. The second composition, according to the patent, likewise requires a urethane latex, an acrylic latex, at least one antimicrobial agent, and a fluorochemical treating agent. The second composition is preferably thicker than the first and is preferably applied using a knife or doctor blade. The coating is dried and cured at an elevated temperature.

Although the fabric resulting from the method as taught above is said to retain the hand and feel of the original fabric while having the desired stain and water resistant qualities, the method has several drawbacks. It is required, for example, that the urethane and acrylic latex compounds be compatible with each other as defined in the patent, thus limiting the choices of latex available. Also, certain fabrics, particularly those with a looser weave, will require additional treatments with the first and/or second treatment compositions. This adds both to the expense of treating the fabric and to the time required to treat the fabric, all with the attendant logistical problems of handling the fabric as it is being repeatedly treated.

A related fabric treatment and process is disclosed in U.S. Pat. No. 6,492,001, the disclosure of which is incorporated herein by reference, and in which the fabric is treated with a first coating solution and is then provided with a polymeric film on one side of the treated fabric. According to this patent, the fabric is treated with an aqueous solution of a fluorochemical, although the solution may include additional components. The treated fabric is then heated to an elevated temperature for a period of time sufficient to cure the coating solution, that is, to dry it and perform any necessary cross-linking. A polymeric film is then attached to one side of the treated fabric. According to the patent specification, the film can be "any curable or cross-linkable polymer, copolymer, blend and the like of polymeric material." It is disclosed that the film can be attached to the treated fabric in any known manner, such as by use of an adhesive, by direct lamination, or by forming the film directly on the fabric. It is also disclosed that the film may be adhered to the fabric prior to the fabric being treated with the aqueous solution. Using this method of attaching a film to fabric can create the potential of the film and the fabric separating or delaminating during further processing or in actual use.

Perhaps a more problematic drawback to the fabric treatment disclosed in the patents such as the '138 patent and others cited above lies in its requirement of the use of a formaldehyde based cross-lining agent. Such cross-linking agents, including the ones listed as preferred in the specification of the '138 patent, are capable of causing a release of formaldehyde and similar compounds event after the treated fabric has been dried and cured. This off-gassing can continue for an appreciable amount of time. Such off-gassing has been thought to contribute to what is known as "sick-building" syndrome and is therefore avoided by those attempting to create healthier environments. In some usages, such as hospitals, the emission of volatile organic compounds (VOCs) such as formaldehyde is strictly limited. Thus, treatments that use, rely on, or result in residual formaldehyde emission are of increasing limited utility, particularly in the very environments for which they are intended.

There is needed in the art a process for treating a fabric, and a fabric product produced thereby, that results in a fabric that retains its original aesthetic qualities while exhibiting enhanced properties such as durability, wear resistance, and stain and water resistance. Moreover, to protect the environment and avoid the creation of unwanted contaminants, it is desired that the process use no formaldehyde or formaldehydic compounds and that the treated fabric not give off such compounds during its useful life.

SUMMARY OF THE INVENTION

It is an object of at least one embodiment of the present invention to provide a treated fabric that is stain resistant, aesthetically appealing as to the feel thereof, and is substantially completely water resistant.

It is another object of at least one embodiment of the present invention to provide a method of treating a fabric to render the fabric stain and water resistant, the method consisting of a minimal number of steps.

It is yet a further object of at least one embodiment of the present invention to produce a treated fabric by a process that does not utilize formaldehyde or formaldehydic compounds.

It is still a further object of at least one embodiment of the present invention to produce a treated fabric that does not "off-gas" or otherwise result in the emission of formaldehyde or similar compounds during further processing or use.

These and other objects are achieved by providing a method for treating a fabric comprising the steps of (1) coating the fabric with a first treatment composition, the first treatment composition having at least one fluorochemical textile treating agent; (2) applying to at least one side of the fabric a second treatment composition, the second treatment composition having a latex, the latex being applied to the fabric in such an amount as to create a latex layer on at least one side of the fabric subsequent to drying the latex; and (3) applying to the latex layer at least one polymeric film, the polymeric film selected so as to render the finally treated fabric substantially completely water resistant.

These and other objects are also achieved by providing a fabric wherein: the fabric has been coated with a first treatment composition to form a coated fabric, the composition having at least one fluorochemical textile treating agent; one side of the coated fabric has been treated with a latex composition such that subsequent to drying the fabric a latex layer is formed on the one side of the fabric; and a polymeric film has been adhered to the latex layer.

DETAILED DESCRIPTION OF THE INVENTION

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

The treatment process, and the resulting product, according to this invention can utilize fabrics made from any fibers. This includes all-natural fibers such as cottons, wools, linens, or silk, and synthetic fibers such as nylons, acetates, polyesters, acrylics, rayons, and others. The fabric can be made of a mixture of natural and synthetic fibers. The fabrics can be of any weave, including but not limited to dobbies, canvases, brocades, and jacquards.

The first step in the process of the current invention is to apply to the fabric a first treatment composition, sometimes referred to herein as the pad mix. The pad mix is an aqueous solution or suspension of at least one fluorochemical textile agent. The fluorochemical textile agent is applied for the purpose of imparting soil, water, and oil repellency and resistance to staining. It also improves the cleanability of the treated fabric. The treatment will also provide some water resistance to the fabric. A preferred fluorochemical treating agent for this purpose is a perfluroalkyl acrylate copolymer, exemplified by Zonyl® 8070, manufactured by DuPont De Nemours and Company (Wilmington, Del.). The agent is preferably present in the aqueous solution in the amount of about 2 to about 40 wt/% and more preferably in a range of about 2 wt % to about 12 wt %. (unless otherwise noted here, all weight percents provided herein are based on the weight of the whole composition, that is, the wet weight). This weight percent can be adjusted, as is known to those of skill in the art, depending on the type of fabric being treated and the intended end use of the fabric. While the agent can be selected from a wide range of compounds, it is an important aspect of this invention that the agent used be entirely free of formaldehyde or formaldehydic compounds. It may be desired, for example, to utilize an agent that must or can be cross-linked or otherwise cured. Where such an agent is used, it is preferred that neither the agent nor the selected cross-linking agent contain, use, or produce formaldehyde. This helps ensure that treated fabric will not produce VOCs in subsequent processing (such as shaping and sewing) or in use.

The pad mix can contain additional components, again depending in part on the type of fabric being treated, the desired qualities of the fabric, and the intended end use of the fabric. By way of example and not limitation, such components can include appropriate anti-microbial agents such as fungicides; stabilizers; dispersants; dyes; and other materials. A particularly preferred component to be included in the pad mix is a non-rewetting surfactant used as a wetter to improve saturation of the fabric by the pad mix. A preferred example of such a surfactant is Amiwet NRW™ produced by AmiTech (Oxford, N.J.). A preferred range for this surfactant is about 0.2 to about 4 wt %.

The pad mix can be applied to the fabric in any known fashion, preferably by drawing the fabric through a bath of the pad mix. Alternatively, the pad mix can be applied by spraying, brushing, wiping, rolling, or other methods. It is preferable that the pad mix permeate the fabric entirely. The coated fabric can then be passed through nip rollers or other devices to both ensure that the pad mix has completely permeated the fabric and to adjust the amount of the pad mix in the fabric.

The fabric is then passed through a drying oven to dry the pad mix and fabric. The drying oven is preferably one allowing an incremental increase in temperatures as the fabric proceeds through the oven. This ensures a thorough and even drying of the fabric.

After the fabric has been dried, it is ready for application of the second treatment composition. While it is within the scope of the current invention to apply additional coats of the pad mix to the fabric, which may be desirable for certain fabrics intended for certain uses, it is more efficient if only a single application of the pad mix will suffice.

The second treatment composition can be either of two preferred forms.

This second treatment composition can be applied as a foam coating or as a straight or regular coating. In either form, it is applied to only one side of the treated fabric. The second treatment composition can be applied by brushing, by application with a knife blade, or by any other means known to the art. It is an aspect of the current invention that, however it is applied, the second treatment composition be applied such that, upon drying and/or curing, there is formed on one side of the fabric a layer of the second treatment composition. Thus, the second treatment composition is applied such that it can permeate the treated fabric to a greater or lesser degree but a sufficient amount of the composition does not permeate the fabric such that, upon drying, a layer is formed.

In its simplest form, the second treatment composition comprises a polymer emulsion, a cross-linker resin, and a formaldehyde scavenger. As was explained with respect to the composition of the pad mix, the polymer emulsion may be selected from a wide range of choices, as can the cross-linker resin. It is an aspect of certain embodiments of this invention that neither the polymer emulsion nor the cross-linker comprise, utilize, produce, or otherwise create any formaldehyde or formaldehydic compounds. It is typical in the prior art that in treating fabrics, polymers or polymer mixes are used that require cross-linking. Typically, the polymers and/or the cross-linking agents are or at least include formaldehyde or formaldehydic compounds. Subsequent processing or treatments can be applied to reduce the presence of such compounds, but such treatments are not entirely successful. The treated fabrics thus produce formaldehyde even after some period of use. While the amount of formaldehyde may be low, or at least less than certain standards, it is nonetheless present.

To prevent any production or off-gassing of formaldehyde, it is an aspect of the current invention that (1) no components are used that are, require the use of, or subsequently produce any formaldehyde and (2) that the treatment include a formaldehyde scrubber. The latter component may in fact be unnecessary, but its presence ensures that should any formaldehyde be present or be produced by the treated fabric, the formaldehyde is not released to the environment.

As described, the primary component of the second treatment composition is a hydrophobic, formaldehyde-free, binder. The binder can be present in the composition in the range of from about 50 to about 100 wt %. While there are a variety of polymers and polymer blends that may be suitable, a preferred binder is a copolymer of styrene and acrylate, an example of which is Hycar® 26-1199 obtained from Noveon Holdings, Inc. (Cleveland, Ohio). This binder has been found to result in a fabric with a softer hand than results from the use of other binders.

The second treatment composition also comprises a non-formaldehyde cross linker. Again, this cross-linking agent can be chosen from a variety of possible agents so long as no formaldehyde is included. A preferred cross-linker is a carbodiimide resin, exemplified by CDI-5 obtained from Advanced Polymers, Inc., Carlstadt, N.J. The cross-linker is preferably present in the treatment composition in the range of from about 0.5 to about 20 wt %.

The third component of the second treatment composition is a formaldehyde scavenger. A preferred scavenger for use in the processes of this invention is ethylene urea. This is a commodity product available from many sources. Ethylene urea is an efficient scavenger and does not appear to interfere with the functions of any other components. In a preferred formulation, the ethylene urea is present in a range of from about 10 to about 20 wt % in the second treatment composition.

Other components may also be contained in the second treatment composition. Components such as foaming aids, anti-microbial agents, and thickeners may also be included. The exact components and the relative amounts thereof may be varied according to the type of fabric being treated and the end use intended. In one preferred composition, in addition to the components in the amounts listed above, the second treatment composition also comprises the following:

(a) ammonium lauryl sulfate as a foaming aid in the range of about 0 to about 20 wt %;
(b) Tinosan® AM110 (Ciba Specialty Chemicals Corporation, Toms River, N.J.), which is an organic, anti-microbial, in the range of about 0.1 to about 10 wt %;
(c) Ammical Flowable (Dow Chemical Company, Midland, Mich.), which is a diiodomethyl-p-tolysulfone for use as in microbial resistance, in the range of about 0.05 to about 10 wt %;
(d) Bacote 20 (Magnesium Elektron Inc., Flemington, N.J.), which is an ammonium zirconium carbonate functioning as a cross-linker and catalyst, in the range of about 0.1 to about 10 wt %;
(e) JATHIX 175 (JAT Systems, Inc.), used as a thickener for rheology modification, in the amount of about 1 to about 40 wt %; and
(f) other components for purposes such as adjusting the pH of the composition to between about 8 to about 10 using, for example, ammonium hydroxide.

The foregoing preferred second treatment composition is a foaming treatment. This is preferred because it allows fine adjustment of the amount that is applied to the fabric. It is possible to apply a relatively thin coat of the second treatment composition and still accomplish the goal of imparting enhanced qualities to the fabric. The second treatment composition imparts additional stain and water resistance, anti-microbial action, enhanced strength and durability, and other qualities even though it is applied to only one side of the fabric. In addition, the second treatment composition also forms a layer on one side of the fabric, the purpose of which is discussed below.

While it is preferred that the second treatment composition be applied as a foam, it can also be applied as an aqueous composition. This form may be preferred where a relatively thicker coating is desired, or in use with a fabric having a very rough surface. The composition can be applied to such fabrics such that some permeation is achieved while at the same time enough of the composition remains on the surface of the fabric to form the intended integral layer when the second treatment composition is dried and cured. A preferred non-foaming composition uses most of the same components as those specified above for the foam form, except that the ammonium lauryl sulfate is replaced by an anti-foaming agent such as a silicone emulsion. An example of such an emulsion is Defoamer SD-10A, available from Small-PAC.

An alternative formulation for the second treatment composition can be supplied in either a foaming or non-foaming low solids mixture. The formulation has been found to offer improvements in binding strength between the coating composition and a subsequently applied urethane film. The coating composition includes:

- a cellulose thickener such as Methocel® J5-MS (Dow Chemical Company, Midland, Mich.) which may be used in a range of about 0.2 to about 8 wt % and in the specific embodiment herein is used in an amount of about 1.64 wt %;
- a water-based polyurethane dispersion such as Sancure® 20025 (Noveon IP Holdings, Inc., Cleveland, Ohio). The indicated polyurethane is a formaldehyde-free formulation and can be used in a range of about 5 to about 60 wt % and is used in an amount of about 24.46 wt % in the presently described embodiment;
- an adhesion enhancer such as Aquatac® 4188 (Arizona Chemical, Jacksonville, Fla.) may be used in an amount of about 0.1 to about 5 wt % and more preferably in a range of about 1.54 wt % in the presently described embodiment;
- a foaming aid such as ammonium lauryl sulfate may be used so as to bring about an effective amount of foaming. In the example used herein, an amount of about 1.57 wt % is found to be an effective amount although it is expected the range may vary depending upon the composition and corresponding weight percents of other reagents within the formulation;
- ammonium hydroxide may be used to adjust the pH and to serve as a thickening agent. In the example described herein, an amount of 0.35 wt % was found to be effective to achieve a desired pH range of between about 7 to about 9, although one having ordinary skill in the art would recognize that greater or lesser amounts may be used to achieve a target pH value and/or thickening properties; and
- optionally, an anti-microbial agent may be added such as the Tinosan® AM110 (Ciba Specialty Chemicals Corporation, Toms River, N.J.) or AM500 NRW (AmiTech) at a 0.1 wt % or greater. In the specific embodiment described herein, an amount of 0.44 wt % was found to be an effective amount.

The alternative embodiment for the secondary coating described above makes no use of a catalyst or cross-linking agent in that the resulting coating has been found to bind better to a polymeric film such as a urethane film when no cross-linking additives or catalysts are present.

An alternative pad finish may also be used which has been found useful in combination with the second embodiment of the second treatment composition. The second pad finish formulation Zonyl® 8070 (DuPont De Nemours Company, Wilmington, Del.) in an amount that may range from 2 to about 40 wt % but more preferably in a range of about 8 to about 12 wt % depending upon the coating needs of the individual fabric. A zirconium catalyst cross-linking coupling agent, ZAA™ from Magnesium Elektron, Inc, (Flemington, N.J.) is present in an amount of between about 0.1 wt % to about 2 wt % and more preferably in an amount of about 0.5 wt %. A non-formaldehyde evolving cross-linker such as Carbodilite® E02 (Advanced Polymers, Inc., Carlstadt, N.J.) may be used in an amount of at least about 0.1 wt % and more preferably in an amount of about 0.55 wt %. A surfactant such as Amiwet NRW™, produced by Ami Technology (Oxford, N.J.) is also added at an effective amount. In a current described formulation, an effective amount is found to be an amount of about 0.07 wt % although it is well within the skill level of one having ordinary skill in the art to identify an effective amount of these and other components of the formulation through routine experimentation. An optional anti-microbial agent such as AM500 NRW™ (AmiTech) can be used in a range of about 0.1 to about 5 wt %. Including the AM500 in an amount of about 0.44 wt % has been found to offer effective anti-microbial resistance as used in the current formulation for conventional fabrics and applications.

For applications where the fabric may be subject to a level of physical abuse or high traffic, the combination of the second embodiment of a pad finish along with the second embodiment of the secondary treatment composition work well together. The resulting treated fabric provides for a strong bond strength to a subsequently applied polymeric film such as a urethane film.

Following application of the second treatment composition, the fabric is again drawn through a curing and drying oven. The temperature of the oven and the residence time of the fabric will be determined as is known in the art depending on the exact composition and amount of the second treatment composition. The result of this curing and drying step is a fabric that is treated throughout with a first treatment composition, and is treated on one side and to a certain depth on that side with a second treatment composition. The side to which the second treatment composition was applied now has an integral coating (the second treatment layer) formed by the second treatment composition.

A final step is the application of a polymeric film to the fabric on the side to which the second treatment composition was applied. The film can be almost any suitable polymeric film, and can be adhered to the second treatment layer in a number of ways. When a urethane film is used, one such method of adhering the film to the treated fabric is by applying a hot melt adhesive. Other methods of adhering the film can be used. The film can, for example, be laminated directly to the second treatment layer or can be formed directly thereon. The film can be selected depending on factors such as the use for which the treated fabric is ultimately intended. As with both treatment compositions, the film is selected to ensure that there will be no off-gassing or other production of formaldehyde from the final product.

The fabric resulting from the process of this invention has many desirable characteristics. Because of the compounds selected for use in the first and second treatment compositions and due to the selection of the film, the fabric will be essentially formaldehyde free. Fabrics made according to this invention will not contribute to any contamination or to "sick building" syndrome and thus are environmentally friendly, "green" fabrics. The fabric products will exhibit long wear characteristics with a high resistance to soil, staining, and water. The formation of the second treatment layer and the use of the film ensure that the fabric is substantially completely water resistant. Moreover, because the film is adhered to the second treatment layer and not directly to the fabric, the possibility that the film will separate from the fabric in subsequent processing or in use is substantially reduced. Finally, the fabric will maintain almost completely its original aesthetic qualities, both tactile and visual. The first treatment composition only minimally affects the feel or hand of the fabric, and has little or no effect on the appearance of the fabric. The second treatment layer and the film are on one side of the fabric. In use, that side will be hidden from view and from touch. There is thus produced a fabric that has the desired characteristics of strength, durability, stain and water resistance, and where desired resistance to microbial agents, while at the same time exhibiting the desired aesthetic characteristics.

It will be apparent to those of skill in the art that the disclosed method, the treatment compositions, and other aspects of the invention can be changed or adjusted for a variety of reasons. So long as the stated goals and requirements of the disclosed method and product are achieved, such changes are within the scope of this invention.

The invention claimed is:

1. A method for treating a fabric comprising the steps of:
   coating the fabric with a first treatment composition, said first treatment composition having at least one fluorochemical textile treating agent;
   applying to at least one side of said fabric a second treatment composition, said second treatment composition having a water-based binder, the latex being applied to said fabric in such an amount as to create a binder layer on at least one side of said fabric subsequent to drying said latex; and,
   applying to at least one of said binder layers at least one polymeric film, said polymeric film selected so as to render the finally treated fabric substantially completely water resistant.

2. The method according to claim 1 wherein said at least one polymeric film is a urethane film.

* * * * *